United States Patent Office 3,766,212
Patented Oct. 16, 1973

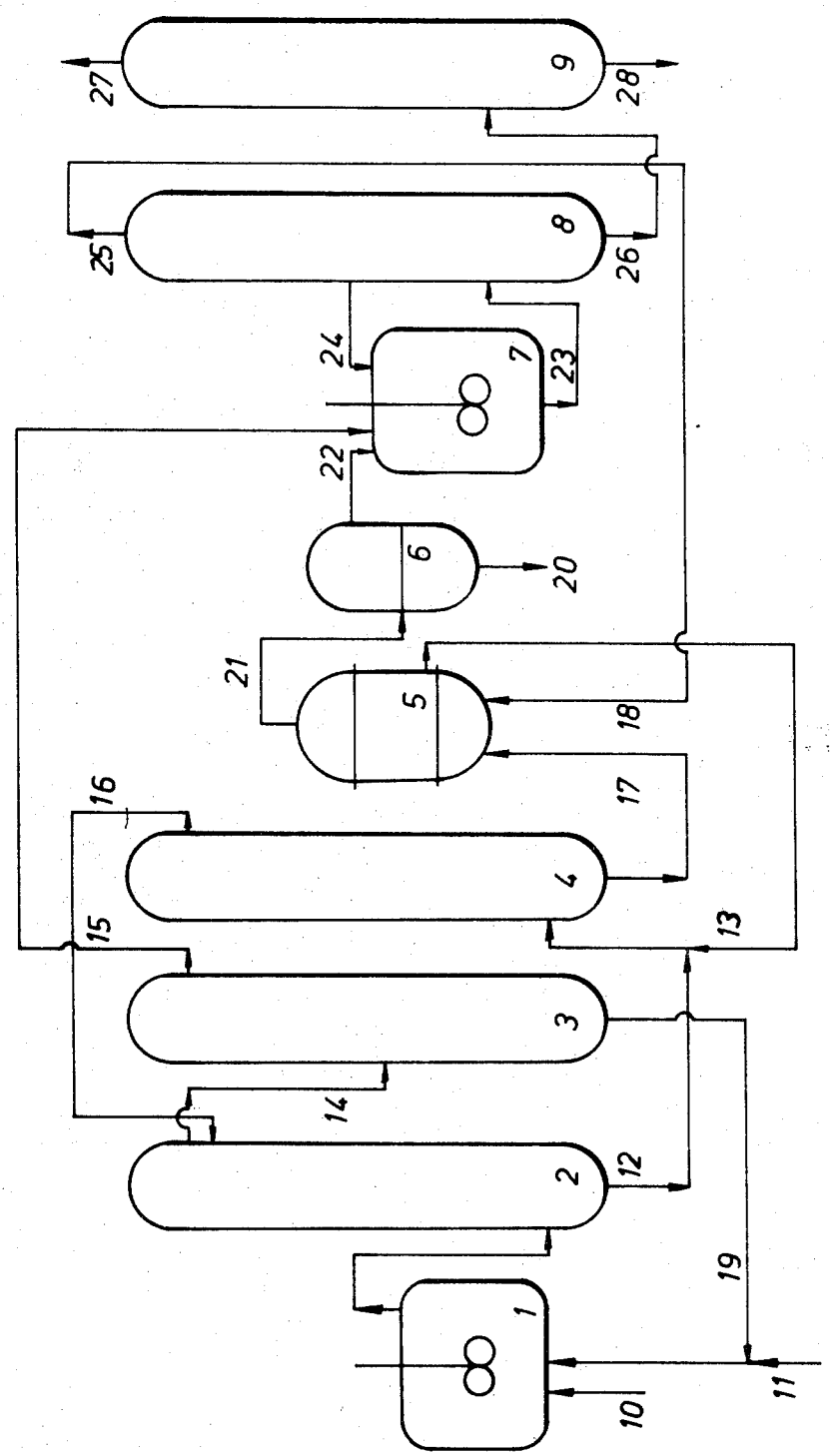

3,766,212
PROCESS FOR THE PREPARATION OF
ε-CAPROLACTONE
Helmut Waldmann, Leverkusen, Wulf Scherdtel, Cologne, and Wolfgang Swodenk, Odenthal-Globusch, Germany, assignors to Bayer Aktiengesellschaft, Leverkusen, Germany
Filed July 29, 1971, Ser. No. 167,395
Claims priority, application Germany, Aug. 1, 1970,
P 20 38 455.8
Int. Cl. C07d 9/00
U.S. Cl. 260—343          29 Claims

ABSTRACT OF THE DISCLOSURE

ε-Caprolactone is prepared by oxidizing cyclohexanol, hydrolyzing the cyclohexanone peroxide formed to hydrogen peroxide and cyclohexanone and extracting the hydrogen peroxide with water in a first stage; mixing the aqueous hydrogen peroxide solution from the first stage with one or more organic phosphorus compounds in a second stage; removing water from the second stage reaction mixture and reacting same with an aliphatic fatty acid, again removing water to form a percarboxylic acid solution which is reacted with the cyclohexanone formed in the first stage to produce ε-caprolactone.

---

The invention relates to a process for the preparation of ε-caprolactone from cyclohexanol.

One method known in the prior art for preparing ε-caprolactone from cyclohexanone and aqueous $H_2O_2$ consists in reacting cyclohexanone with dilute aqueous hydrogen peroxide to precipitate cyclohexanone peroxides, e.g. 1,1'-dihydroxy-dicyclohexyl peroxide and 1-hydroxy-1'-hydroperoxy-dicyclohexyl peroxide (E. G. E. Hawkins, J. Chem. Soc. (C), 3463 (1955)). It is also described in the literature that open-chained cyclohexanone peroxides, dicyclohexylidene diperoxide and trimeric cyclic cyclohexanone peroxide can be converted into 6-formyl-hydroxy caproic acid by means of a large excess of formic acid (see French Pat. No. 1,533,936). Pyrolysis of derivatives of 6-hydroxy caproic acid entails material losses (see French Pat. No. 1,474,098) and involves considerable expenditure in apparatus and energy. Formic acid which results from the pyrolysis of 6-formyl-hydroxy caproic acid cannot be recovered and its presence is therefore a liability in any technical process. Moreover, the problems of corrosion are particularly serious in processes which involve the presence of formic acid.

Apart from the disadvantages of pyrolysis already mentioned above there is the added disadvantage in a process of this type that highly explosive cyclohexanone peroxides are worked up in solid form as intermediate products; in a plant for production on a technical scale this would obviously require expensive safety measures.

Another possibility of producing ε-caprolactone from cyclohexanone and peracetic acid with high yields and substantially without side reactions lies in the well-known reaction of Bayer and Villiger (Berichte der dtsch. chem. Ges. 32, 3625 (1899); Houben-Weyl, Methoden der organischem Chemie, volume 6/2, page 708). In order first to prepare cyclohexanone and hydrogen peroxide from cyclohexanol, cyclohexanol may be oxidised in known manner with molecular oxygen in the liquid phase to produce cyclohexanone peroxide which may then be hydrolised to form hydrogen peroxide and cyclohexanone (German Pat. 935,303). The reaction schema for this preparation is as follows:

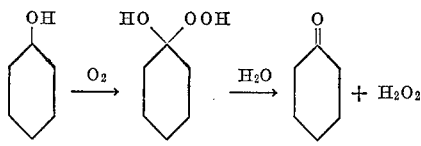

Although $H_2O_2$ and cyclohexanone can be obtained in almost equimolecular quantities from cyclohexanol, the hydrogen peroxide formed in the process can only be isolated in the form of dilute aqueous solutions (see E. G. Hawkins, Journal of Organic Chemistry (C) 2691 (1969)) which according to the state of the art can be converted only partially into low-molecular weight aliphatic percarboxylic acids and with a considerable rate of decomposition and only with considerable expenditure in distillation (Organic Reactions, volume 7, page 395 (1953)); U.S. Pat. No. 2,919, 975). In order to be able to prepare ε-caprolactone from cyclohexanone and aqueous hydrogen peroxide by the method of Bayer-Villiger, it is necessary to use $H_2O_2$ in a highly concentrated form. A typical example of such a process (British Pat. No. 1,070,323) consists in reacting an 83.5% hydrogen peroxide solution with a large excess of formic acid and then reacting the resulting mixture with cyclohexanone. If performic acid is not previously formed from $H_2O_2$ and formic acid but instead all the components are added together at the same time, the yield of ε-caprolactone drops to values below 40% and the product obtained consists mainly of cyclohexanone peroxides. It is obvious that the incomplete conversion of hydrogen peroxide to the peracid and the possibility of the formation of explosive cyclohexanone peroxides are disadvantages for such a process (E. G. E. Hawkins, Journal of Organic Chemistry (C) 2691 (1969)). If the above reaction is carried out at a slightly elevated temperature, e.g. at 90° C., 6-formyl-hydroxy caproic acid is formed as already mentioned above, and this then yields ε-caprolactone only after pyrolysis.

Furthemore, it could not be expected from the state of the art that an anhydrous solution of hydrogen peroxide in an inert organic solvent could be obtained from the reaction mixture of cyclohexanol and approximately 10% cyclohexanone peroxide in analogy with the system isopropanol/acetone peroxide (see German Offenlegungsschrift No. 1,925,379). In the said system, the mixture of isopropanol, acetone and hydrogen peroxide (or acetone peroxides) obtained by the oxidation of isopropanol may be treated with an ethyl acetate solvent, isopropanol and acetone may be removed, e.g. by distillation, the resulting solution of hydrogen peroxide in an ethyl acetate solvent may be reacted with acetic acid to form peracetic acid, and the water which is formed in addition to peracetic acid may be removed by azeotropic distillation. The reaction may be explained by the following reaction scheme:

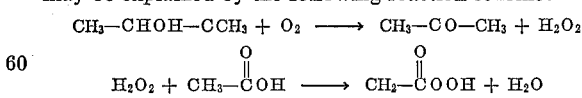

Such a procedure is, of course, restricted to a hydrogen peroxide which has been obtained in a highly volatile solvent so that it can easily be separated by distillation. The boiling points of the individual components are so close together, especially in the case of cyclohexanol, cyclohexanone and hydrogen peroxide, that separation by distillation is not contemplated. Moreover, this method of procedure entails a considerable rate of decomposition of the peroxide even in the system of isopropanol/acetone peroxide which is the one most suitable for such a process.

Compared with the state of the art, this invention provides a surprisingly simple method of being able to produce ε-caprolactone from cyclohexanol without these disadvantages by oxidising cyclohexanol in the liquid phase with molecular oxygen, hydrolysing the initially formed cyclohexanone peroxides to cyclohexanone and hydrogen peroxide, extracting the hydrogen peroxide with water in a first stage, adding to the resulting dilute aqueous solution of hydrogen peroxide in a second stage compounds of the following formula:

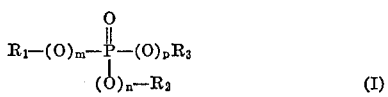  (I)

wherein $m$, $n$ and $p$ represent 0 or the integer 1 provided that $m$, $n$ and $p$ must not all simultaneously represent 0;

$R_1$, $R_2$ and $R_3$ represent straight-chain or branched chain $C_1$–$C_6$ alkyl or $C_4$–$C_6$ cycloalkyl radicals optionally substituted with halogen, OH, $C_1$–$C_4$ alkoxy, carbo-$C_1C_3$ alkoxy, CN or phenyl, and one of the radicals $R_1$, $C_1$–$C_6$ alkyl or $C_4$–$C_6$ cycloalkyl radicals optionally substituted with halogen, OH, $C_1$–$C_4$ alkyl, $C_1$–$C_4$ alkoxy or CN and $R_1$ together with $R_2$ may represent a $C_2$–$C_4$ alkylene radical, removing substantially all of the water from the second stage reaction mixture, preferably by vacuum distillation, reacting same with an optionally substituted aliphatic fatty acid which preferably has 1–6 carbon atoms, optionally in the presence of an esterification catalyst, dehydrating once more, optionally with the aid of an inert diluent, and reacting the resulting percarboxylic acid solutions in known manner, either unchanged or after neutralisation of the esterification catalyst or purification of the percarboxylic acid, with the cyclohexanone formed in the first stage to produce ε-caprolatone.

DESCRIPTION OF THE DRAWING

The drawing is a diagrammatic representation of a preferred method for carrying out the claimed process continuously.

The following are mentioned as examples of $C_1$–$C_6$ alkyl or $C_4$–$C_6$ cycloalkyl radicals, optionally substituted with halogen (fluorine, chlorine or bromine), hydroxyl, $C_1$–$C_4$ alkoxy, carbo-$C_1$–$C_3$ alkoxy, CN or phenyl: methyl, chloromethyl, hydroxymethyl, methoxymethyl, cyanomethyl, trifluoromethyl, benzyl, ethyl, chloroethyl, hydroxyethyl, methoxyethyl, carbomethoxyethyl, cyanoethyl, phenylethyl, propyl, 1,2,3-trifluoropropyl, trifluoromethylethyl, isopropyl, n-butyl, sec.-butyl, isobutyl, 2-methoxybutyl, 3-methoxybutyl, 4-methoxybutyl, 2-cyanobutyl, 3-cyanobutyl, 4-cyanobutyl, n-pentyl, 2-methylbutyl, 3-methylbutyl, ω-chloropentyl, ω-hydroxymethyl, ω-methoxypentyl, 2-methyl-2-cyanopentyl, 2-methyl-2-methoxypentyl, 3-methyl-2-methoxypentyl, 3-methyl-2-methoxybutyl, 3-methyl-3-chlorobutyl, 3-methyl-2-chlorobutyl, 2-carbomethoxypropyl, 3-carbomethoxypropyl, 3-carbomethoxy-2-methylpropyl, 2-carbomethoxybutyl, 3-carbomethoxybutyl, 4-carbomethoxybutyl, 2-chloropropyl, 3-chloropropyl, 2-chloro-1-chloroethylethyl; cyclobutyl, cyclopentyl, methylcyclopentyl, cyclohexyl, 2-methyl-cyclohexyl, 3-methylcyclohexyl, 4-methyl-cyclohexyl, 1,1,3-trimethylcyclohexyl, chlorocyclohexyl, hydroxycyclohexyl, 4-methoxycyclohexyl, phenylcyclohexyl, 2-tert.-butyl-cyclohexyl, 3-tert.-butyl-cyclohexyl, 4-tert.-butyl-cyclohexyl, 1-methyl-4-isopropylcyclohexyl, 2-chlorocyclopentyl, 3-chlorocyclopentyl, 2-cyanocyclopentyl, 3-cyanocyclopentyl, 2-carbomethoxycyclopentyl, 3-carbo- methoxycyclopentyl, 2-methoxymethylcyclopentyl, 3-methoxymethylcyclopentyl, 2-hydroxycyclopentyl, 3-hydroxycyclopentyl, 2-hydroxymethylcyclopentyl, 3-hydroxmethylcyclopentyl, 2-chlorocyclohexyl, 3-chlorocyclohexyl, 4-chlorocyclohexyl, 2-cyanocyclohexyl, 3-cyanocyclohexyl, 4-cyanocyclohexyl, 2-hydroxycyclohexyl, 3-hydroxycyclohexyl, 4-hydroxycyclohexyl, 2-methoxycyclohexyl, 3-methoxycyclohexyl, 4-methoxycyclohexyl, 2-hydroxymethylcyclohexyl, 3-hydroxymethylcyclohexyl, 4-hydroxymethylcyclohexyl, 2-carbomethoxycyclohexyl, 3-carbomethoxycyclohexyl and 4-carbomethoxycyclohexyl.

The following are examples of suitable phenyl radicals which may be substituted with haolgen, hydroxy, $C_1$–$C_4$ alkyl, $C_1$–$C_4$ alkoxy or CN: 2-chlorophenyl, 3-chlorophenyl, 4-chlorophenyl, 2,4-dichlorophenyl, 2,5-dichlorophenyl, 2-hydroxyphenyl, 4-hydroxyphenyl, 2-methylphenyl, 4-methylphenyl, 4-trifluoromethylphenyl, 4-tert.-butylphenyl, 3-hydroxyphenyl, 2-cyanophenyl, 3-cyanophenyl, 4-cyanophenyl, 2-methoxyphenyl, 3-methoxyphenyl, 4-methoxyphenyl, 2-carbomethoxyphenyl, 3-carbomethoxyphenyl, 4-carbomethoxyphenyl, 2-trifluoromethylphenyl, 3-trifluoromethylphenyl and 3-methylphenyl.

The following are suitable alkylene radicals $R_1$ and $R_2$ or $R_1$ and $R_3$ or $R_2$ and $R_3$: ethylene, propylene, butylene, pentamethylene and hexamethylene.

Among the compounds of Formula I, the following are preferred for the process according to the invention: phosphoric acid derivatives of the General Formula II:

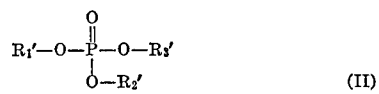  (II)

wherein $R_1'$, $R_2'$ and $R_3'$ represent $C_1$–$C_4$ alkyl or cyclopentyl or cyclohexyl radicals optionally substituted with halogen, hydroxyl, $C_1$–$C_4$ alkoxy, carbo-$C_1$–$C_3$ alkoxy, cyanogen or phenyl radicals, and one of the radicals $R_1'$, $R_2'$ or $R_3'$ may represent a phenyl radical optionally substituted with halogen, hydroxyl, $C_1$–$C_4$ alkyl, $C_1$–$C_4$ alkoxy or CN radicals;

phosphonic acid derivatives of the General Formula III:

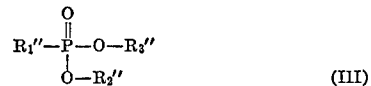  (III)

wherein $R_1''$ represents a $C_1$–$C_4$ alkyl or a cyclopentyl or cyclohexyl or phenyl radical optionally substituted with halogen, hydroxyl, $C_1$–$C_4$ alkoxy, carbo-$C_1$–$C_3$ alkoxy, CN or phenyl;

$R_2''$ and $R_3''$ represents a $C_1$–$C_6$ or $C_4$–$C_6$ cycloalkyl radical optionally substituted with halogen, hydroxyl, $C_1$–$C_4$ alkoxy, carbo-$C_1C_3$ alkoxy, CN or phenyl radicals;

phosphinic acid derivatives of the following Formula IV:

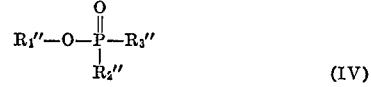  (IV)

wherein $R_1''$, $R_2''$ and $R_3''$ have the meaning indicated for (III);

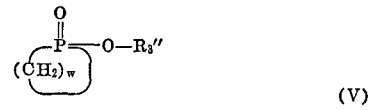  (V)

wherein $R_3''$ has the meaning indicated for (III) and $w$ represents an integer of 4 to 7.

Among the compounds of Formulae I–V, compounds of the following formulae are particularly suitable for carrying out the process according to the invention:

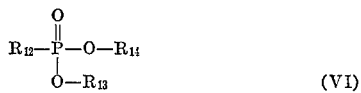

wherein $R_{12}$, $R_{13}$ and $R_{14}$ represents straight-chain or branched chain $C_1$–$C_4$ alkyl radicals optionally subsituted with halogen, hydroxyl, $C_1$–$C_4$ alkoxy, carbo-$C_1$–$C_3$ alkoxy, CN or phenyl radicals;

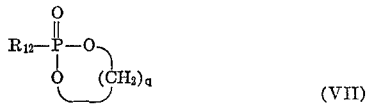

wherein $R_{12}$ has the meaning indicated for Formula VI and $q$ represents an integer 2, 3 or 4;

wherein $R_{12}$, $R_{13}$ and $R_{14}$ have the meaning already indicated for (VII);

wherein $R_{14}$ has the meaning already defined for (VI) and $t$ represents the integer 4 or 5.

The group of compounds represented by the following formulae is particularly advantageous:

wherein $R_{12}'$ represents a straight-chain or branched chain $C_1$–$C_4$ alkyl radical optionally substituted with a hydroxyl or methoxy group and $R_{13}$ has the meaning already indicated for (VI);

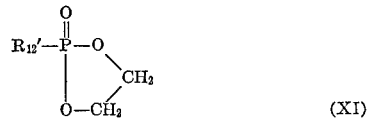

wherein $R_{12}'$ has the meaning already indicated for (VI).

The following compounds are mentioned as specific examples of compounds which may be added according to the invention to the dilute aqueous hydrogen peroxide solutions which have been obtained by hydrolysis followed by extraction of the cyclohexanone peroxide solutions:

Trimethyl phosphate, triethyl phosphate, tri-n-propyl phosphate, tri-isopropyl phosphate, tri-isobutyl phosphate, tri-sec.-butyl phosphate, tri-isobutyl phosphate, trichloromethyl phosphate, trihydroxymethyl phosphate, trimethoxymethyl phosphate, tricarbomethoxymethyl phosphate, tri - 2 - methoxybutyl phosphate, tri-2-cyanobutyl phosphate, tri-3-cyanobutyl phosphate, tri-2-methylbutyl phosphate, tri-3-methylbutyl phosphate, mono-ω-hydroxypentyldiethyl phosphate, mono-ω-chloropentyldimethyl phosphate, mono-3-methyl - 2 - cyanopentyldiethyl phosphate, mono-3-methoxy - 2 - chloromethylpropyldiethyl phosphate, mono-3-methyl - 2 - chlorobutyldiethyl phosphate, mono - 2 - carbomethoxypropyldiethyl phosphate, mono-3-carbomethoxypropyldiethyl phosphate, mono-2-chloro-2-chloroethyldiethyl phosphate, tricyclobutyl phosphate, tricyclohexyl phosphate, mono-cyclohexyldiethyl phosphate, mono - 2 - methylcyclohexyldiethyl phosphate, mono - 3 - methylcyclohexyldiethyl phosphate, mono-hydroxycyclohexyl phosphate, di-2-hydroxycyclohexylmonoethyl phosphate, ethylene glycol-monoethyl phosphate, ethylene glycol-β-chloroethyl phosphate, propylyene glycol-(1,3)-monoethyl ester, butylene glycol-(1,4)-mono- ethyl phosphate, mono - 2 - tert.-butyl-cyclohexyldiethyl phosphate, mono-2-chloropentyldiethyl phosphate, mono-4-carbomethoxycyclohexyldiethyl phosphate, mono-4-methoxycyclohexyldiethyl phosphate, mono-4-chlorocyclohexyldiethyl phosphate, mono-4-cyanocyclohexyldiethyl phosphate, mono-4-hydroxymethylcyclohexyldiethyl phosphate;

Methane phosphonic acid dimethyl ester, methane phosphonic acid diethyl ester, methane phosphonic acid dipropyl ester, methane phosphonic acid tri-isopropyl ester, methane phosphonic acid dibutyl ester, methane phosphonic acid di-sec.-butyl-ester, methane phosphonic acid di-isobutyl ester, methane phosphonic acid dichloromethyl ester, methane phosphonic acid dihydroxymethyl ester, methane phosphonic acid dimethoxymethyl ester, methane phosphonic acid dicarbomethoxymethyl ester, methane phosphonic acid di-2-methoxymethyl ester, methane phosphonic acid di-2-methoxybutyl ester, methane phosphonic acid di-2-cyanobutyl ester, methane phosphonic acid di-3-cyanobutyl ester, methane phosphonic acid di-2-methylbutyl ester, methane phosphonic acid di-3-methylbutyl ester, methane phosphonic acid monohydroxypentyl monoethyl ester, methane phosphonic acid mono-ω-chloropentyl monoethyl ester, methane phosphonic acid mono-3-methyl-2-cyanomethyl monoethyl ester, methane phosphonic acid mono-2-methoxy-2-chloromethylpropane monomethyl ester, methane phosphonic acid mono-3-methyl-2-chlorobutyl-monomethyl ester, methane phosphonic acid mono-2-carbomethoxy-propyl-monoethyl ester, methane phosphonic acid mono-2-chloro-1-chloroethyl monomethyl ester, methane phosphonic acid dicyclobutyl ester, methane phosphonic acid dicyclohexyl ester, methane phosphonic acid monocyclohexyl-monomethyl ester, methane phosphonic acid mono-2-methylcyclohexyl monomethyl ester, methane phosphonic acid mono-3-methylcyclohexyl-monoethyl ester, methane phosphonic acid mono-2-hydroxy-cyclohexyl-monoethyl ester, methane phosphonic acid ethylene glycol ester, methane phosphonic acid propylene glycol-(1,3)-ester, methane phosphonic acid butylene glycol-(1,4) ester, methane phosphonic acid mono-tert.-butyl-ethyl ester, methane phosphonic acid mono - 2 - carbohydroxycyclopentyl-monoisopropyl ester, methane phosphonic acid mono - 4 - carbomethoxy-cyclohexyl monomethyl ester.

Derivatives of the following acids corresponding to the above mentioned derivatives of methane phosphonic acid: ethane phosphonic acid, n-propane phosphonic acid, isopropane phosphonic acid, n-butane phosphonic acid, sec.-butane phosphonic acid, tert.-butane phosphonic acid, isobutane phosphonic acid, n-pentane phosphonic acid, n-hexane phosphonic acid, cyclopentane phosphonic acid, cyclohexane phosphonic acid, phenyl phosphonic acid, chloromethane phosphonic acid, hydroxymethane phosphonic acid, methoxymethane phosphonic acid, cyanomethane phosphonic acid, trifluoromethane phosphonic acid, benzylmethane phosphonic acid, β-chloroethane phosphonic acid, β-hydroxyethane phosphonic acid, β-methoxyethane phosphonic acid, β-cyanoethane phosphonic acid, β-carbomethoxyethane phosphonic acid, 1,2,3-trifluoropropane phosphonic acid, triguoromethylethane phosphonic acid, 4-methoxybutane phosphonic acid, 2-cyanobutane phosphonic acid, 3-cyanobutane phosphonic acid, 4-cyanobutane phosphonic acid, 2-methylbutane phosphonic acid, 3-methylbutane phosphonic acid, ω-chloropentane phosphonic acid, ω-hydroxypentane phosphonic acid, ω-methoxypentane phosphonic acid, 2-carbomethoxypropane phosphonic acid, ω-carbomethoxybutane phosphonic acid, 2-chloropropane phosphonic acid, 2-chloro-1-chloroethylethane phosphonic acid, 2-chlorocyclopentane phosphonic acid, 3-chlorocyclopentane phosphonic acid, 3-cyanocyclopentane phosphonic acid, 2-carbomethoxycyclopentane phosphonic acid, 3-methoxymethylcyclopentane phosphonic acid, 2-chlorocyclohexane phosphonic acid, 4-methoxycyclohexane phosphonic acid, 4-cyanocyclohexane phosphonic acid, 4-hydroxycyclohexane phosphonic acid, 2-chlorophenyl phosphonic acid, 3-chlorophenyl phosphonic acid, 2,5-dichlorophenyl phosphonic acid, 2-hydroxyphenyl phosphonic acid, 4-trifluoromethylphenyl phosphonic acid; dimethyl phosphinic acid methyl ester, dimethyl phosphinic acid ethyl ester, dimethyl phosphinic acid propyl ester, dimethyl phosphinic acid isopropyl ester, dimethyl phosphinic acid n-butyl ester, dimethyl phosphinic acid sec.-butyl ester, dimethyl phosphinic acid tert.-butyl ester, dimethyl phosphinic acid isobutyl ester, dimethyl phosphinic acid n-pentyl ester, dimethyl phosphinic acid 1-methyl-butyl ester, dimethyl phosphinic acid 2-methyl-butyl ester, dimethyl phosphinic acid 3-methyl-butyl ester, dimethyl phosphinic acid n-hexyl ester, dimethyl phosphinic acid 1-methyl-pentyl ester, dimethyl phosphinic acid 2-methyl-pentyl ester, dimethyl phosphinic acid 3-methyl-pentyl ester, dimethyl phosphinic acid 4-methylpentyl ester, dimethyl phosphinic acid 1-ethyl-butyl ester, dimethyl phosphinic acid 2-ethyl-butyl ester, dimethyl phosphinic acid 3-ethyl-butyl ester, dimethyl phosphinic acid chloromethyl ester, dimethyl phosphinic acid hydroxymethyl ester, dimethyl phosphinic acid methoxymethyl ester, dimethyl phosphinic acid $\beta$-chloroethyl ester, dimethyl phosphinic acid $\beta$-cyanoethyl ester, dimethyl phosphinic acid $\beta$-hydroxyethyl ester, dimethyl phosphinic acid $\beta$-methoxyethyl ester, dimethyl phosphinic acid $\beta$-carbomethoxyethyl ester, dimethyl phosphinic acid 2,2,2-tri-fluoroethyl ester, dimethyl phosphinic acid cyclopentyl ester, dimethyl phosphinic acid cyclohexyl ester, dimethyl phosphinic acid 2-methyl-cyclopentyl ester, dimethyl phosphinic acid 3-methyl-cyclopentyl ester, dimethyl phosphinic acid 2-methyl-cyclohexyl ester, dimethyl phosphinic acid 3-methyl-cyclohexyl ester.

Dimethyl phosphinic acid 4-methyl-cyclohexyl ester, dimethyl phosphinic acid 2-chloro-cyclopentyl ester, dimethyl phosphinic acid 3-chloro-cyclopentyl ester, dimethyl phosphinic acid 2-chloro-cyclohexyl ester, dimethyl phosphinic acid 3-chlorocyclohexyl ester, dimethyl phosphinic acid 4-chloro-cyclohexyl ester, dimethyl phosphinic acid 2-cyano-cyclomethyl ester, dimethyl phosphinic acid 3-cyano-cyclopentyl ester, dimethyl phosphinic acid 2-cyano-cyclohexyl ester, dimethyl phosphinic acid 3-cyano-cyclohexyl ester, dimethyl phosphinic acid 4-cyano-cyclohexyl ester, dimethyl phosphinic acid 2 - hydroxy-cyclopentyl ester, dimethyl phosphinic acid 3-hydroxycyclopentyl ester, dimethyl phosphinic acid 2 - hydroxy-cyclohexyl ester, dimethyl phosphinic acid 3 - hydroxy-cyclohexyl ester, dimethyl phosphinic acid 4 - hydroxy-cyclohexyl ester, dimethyl phosphinic acid 2 - methoxy-cyclopentyl ester, dimethyl phosphinic acid 3 - methoxy-cyclopentyl ester, dimethyl phosphinic acid 2 - methoxy-cyclohexyl ester, dimethyl phosphinic acid 3 - methoxy-cyclohexyl ester, dimethyl phosphinic acid 4 - methoxy cyclohexyl ester, dimethyl phosphinic acid phenyl ester, dimethyl phosphinic acid 2 - methyl-phenyl ester, dimethyl phosphinic acid 2-chloro-phenyl ester, dimethyl phosphinic acid 2-methoxy-phenyl ester, dimethyl phosphinic acid 2-cyano-phenyl ester, dimethyl phosphinic acid 2-carbomethoxy-phenyl ester, dimethyl phosphinic acid 3-methyl-phenyl ester, dimethyl phosphinic acid 3-chloro-phenyl ester, dimethyl phosphinic acid 3-methoxy-phenyl ester, dimethyl phosphinic acid 3-cyano-phenyl ester, dimethyl phosphinic acid 3-carbomethoxy-phenyl ester, dimethyl phosphinic acid 4-cyano-phenyl ester, dimethyl phosphinic acid 4-chloro-phenyl ester, dimethyl phosphinic acid 4-hydroxyphenyl ester, dimethyl phosphinic acid 4-methoxyphenyl ester, dimethyl phosphinic acid 4-carbomethoxyphenyl ester and dimethyl phosphinic acid 4-tert.-butylphenyl ester.

Derivatives of the following acids corresponding to the above mentioned derivatives of dimethyl phosphinic acid are suitable: diethyl phosphinic acid, di-n-propyl phosphinic acid, di-n-butyl phosphinic acid, di-isobutyl phosphinic acid, di-sec.-butyl phosphinic acid, methylethyl phosphinic acid, methylpropyl phosphinic acid, ethylpropyl phosphinic acid, dicyclopentyl phosphinic acid, dicyclohexyl phosphinic acid, cyclopentylmethyl phosphinic acid, cyclohexylethyl phosphinic acid, phenylethyl phosphinic acid, bis - $\beta$ - cyanoethyl phosphinic acid, bis-$\beta$-chloroethyl phosphinic acid, bis-$\beta$-hydroxyethyl phosphinic acid, bis-$\beta$-methoxyethyl phosphinic acid, bis-$\beta$-carbomethoxyethyl phosphinic acid, bis-tri-fluoromethane phosphinic acid and 1-hydroxy-1-oxo-phospholan.

As a rule, cyclohexanol is oxidised with molecular oxygen at a temperature in the range of from 100° C. to 150° C. and at a pressure of from 6 to 12 excess atmospheres to produce a solution containing about 10% of cyclohexanone peroxide in excess cyclohexanol, which after hydrolysis and extraction with water yields an approximately 2.5–7% solution of hydrogen peroxide. The resulting dilute aqueous solution of hydrogen peroxide may be added directly to a compound of Formula I and then dehydrated. In most cases, however, it is preferred to free the aqueous hydrogen peroxide solution from dissolved cyclohexanone and cyclohexanol before or after the addition of the compound of Formula I, preferably by extraction with a suitable solvent, e.g. cyclohexane.

Instead of individual compounds there may also be used mixtures of compounds of Formula I. For example, a mixture of several phosphonic acid esters with different structures or one or more phosphonic acid esters mixed with one or more phosphoric acid esters may be used. The phosphorus compounds are mixed in such proportions that the physical properties of the mixture afford the most advantageous conditions for working up the reaction products, i.e. the mixtures are so chosen that by virtue of their solubility and their boiling point they afford some advantage over the use of only a single compound of Formula I.

The quantity of compound or mixture of compounds of Formula I added according to the invention to the aqueous hydrogen peroxide solution may vary within wide limits. The proportion of phosphorus compounds to aqueous hydrogen peroxide solution depends, of course, on the properties such as the miscibility of the phosphorus compound mixtures of Formula I, in particular the solubility properties such as the miscibiilty of the phosphorus compounds with the aqueous hydrogen peroxide solution. In general, the quantity of compound of Formula I used is such that after dehydration there remains a solution which contains from 5 to 50% by weight and preferably from 15 to 30% by weight of hydrogen peroxide.

Dehydration generally entails first removing the water from the substantially homogeneous mixture of hydrogen peroxide, water and organic phosphorus compound according to Formula I. This may be carried out by various known methods, e.g. by distillation, azeotropic distillation with an inert diluent, freezing of the water, binding of the water to a dehydrating agent, or other suitable methods. Practically anhydrous solutions of hydrogen peroxide, or at least solutions of hydrogen peroxide which have a very low water content, in organic phosphorus compounds of Formula I are obtained in this way, and to these solutions there are then added aliphatic fatty acids which have preferably 1–6 carbon atoms. Dehydration is then advantageously again carried out and the water which has been formed in accordance with the following equation is removed:

The resulting solutions of percarboxylic acids in the organic phosphorus compounds of Formula I may then be worked up directly or alternatively the percarboxylic acids may first be isolated, e.g. by crystallisation, distillation or simultaneous distillation with an inert diluent.

In most cases it is preferred to remove the water which has been introduced with the hydrogen peroxide by simple distillation, preferably in a vacuum below 400 mm. Hg and advantageously between 100 and 20 mm. Hg. This dehydration may be carried out with the aid of conventional technical apparatus such as true evaporators, thin layer evaporators or down flow evaporators, with or without a distillation column. According to a particularly preferred embodiment of the process, water and particularly the last remnants of water are removed by azeotropic distillation with an inert diluent, e.g. benzene, toluene, xylene, methyl acetate, ethyl acetate, propyl acetate, butyl acetate, isoamyl acetate, propyl propionate or methylene chloride. Azeotropic distillation is advantageously also carried out under vacuum, e.g. at pressures below 400 mm. Hg and preferably between 200 and 220 mm. Hg. In this way, the temperature in the distillation sumps can be kept below 90° C. and preferably below 70° C. Since dehydration is advantageously carried out again after the addition of the carboxylic acid, it will frequently be preferred to carry out the reaction of hydrogen perxoide with carboxylic acids simultaneously with the removal of the water which was originally used as a solvent for $H_2O_2$. According to a preferred embodiment of the process, the final dehydration of the hydrogen peroxide solutions is carried out concomitantly with the reaction of carboxylic acids with $H_2O_2$, in particular by azeotropic distillation with an inert diluent. A mixture of aromatic hydrocarbons and carboxylic acid, e.g. benzene, toluene, xylene and propyl propionate, is advantageously used for this purpose. As a result of dehydrating with a mixture of aromatic hydrocarbons and esters, only a very small quantity of hydrogen peroxide distils over the top of the column with the solvent while at the same time a high rate of dehydration is achieved. Owing to the tendency of the reaction porducts to undergo decomposition, the vacuum applied is preferably such that the boiling temperature will be below 90° C. and preferably in the range from 70° C. to 40° C. A particularly advantageous diluent to use is methylene chloride. If this is used there is no need to apply a vacuum. The azeotropic distillation may be carried out in any technical apparatus commonly used for this purpose. It will generally be carried out in an analogous manner to an esterification reaction with continuous removal of the aqueous phase of the condensed distillation vapours.

Suitable carboxylic acids for the reaction of hydrogen peroxide to percarboxylic acid are any aliphatic fatty acids which are inert with the reaction medium. It is preferred to use carboxylic acids which are readily soluble in the reaction medium according to the invention. These are particularly the low straight-chained aliphatic fatty acids which have 1–6 carbon atoms, in particular formic acid, acetic acid, propionic acid, butyric acid, chloroacetic acid, trifluoroacetic acid and valeric acid. Derivatives of carboxylic acids could also be used so that the carboxylic acid, carboxylic acid anion or acyl radical, e.g. acid chlorides, esters or salts, is liberated only under the reaction conditions.

According to the invention, the reaction of hydrogen peroxide with carboxylic acids may be carried out practically quantitatively. For this purpose, the carboxylic acid may be used in stoichiometric quantity. To achieve a more rapid reaction, however, it is advantageous to use an excess of the carboxylic acid. The molar ratio of hydrogen peroxide to carboxylic acid is preferably between 1:1.1 and 1:1.2.

The reaction of $H_2O_2$ with carboxylic acids to form percarboxylic acid and $H_2O$ is advantageously accelerated with known esterification catalysts, e.g. sulphuric acid, paratoluene sulphonic acid, ionic exchangers, zeolites (see textbooks, including Houben-Weyl, Methoden der organischen Chemie, 4th edition).

ε-Caprolactone can easily be obtained in very high yields from the percarboxylic acid solutions which collect as sump in the dehydration column. Since the reaction of $H_2O_2$ with carboxylic acids is advantageously accelerated with esterification catalysts, the particular catalyst used must be taken into account in the subsequent reaction with cyclohexanone since, for example, sulphuric acid releases the polymerisation of ε-caprolactone. This can be avoided by neutralising the sulphuric acid with slightly more than the calculated quantity of one of the usual bases, preferably an organic base such as pyridine, alkyl pyridine, quinoline, triethylamine or N,N-dimethylbenzylamine and then carrying out the reaction with cyclohexanone to produce ε-caprolactone. Disturbances hardly occur when sparingly soluble esterification catalysts are used because no interfering substances then enter the percarboxylic acid solutions.

Since the low molecular weight percarboxylic acids are relatively volatile, a certain amount of peracids, e.g. performic acid and peracetic acid, may be driven off with the dehydrating agent on dehydration, especially if dehydration is carried out in a vacuum. This does not entail any loss since peracids can easily be isolated or returned to the reaction without loss. Thus for example they may be returned to the aqueous starting solution of hydrogen peroxide as the the lower phase of the condensed distillation vapours. On the other hand, the peracids may be isolated by the usual measures, e.g. by extraction from the aqueous phase of the condensed distillation vapours.

The ease with which percarboxylic acids, e.g. peracetic acid, are driven off with the dehydrating agent, e.g. toluene, xylene, butyl acetate, amyl acetate, propyl propionate and butyl propionate, may be utilised in an advantageous manner for purifying the percarboxylic acids. According to a preferred embodiment of the invention, therefore, percarboxylic acids and especially peracetic acid may be separated from the reaction mixture, especially from soluble esterification catalysts such as sulphuric acid, by distilling them over together with the diluent, preferably under a vacuum of below 100 mm. Hg, and reacting the resulting solutions of percarboxylic acids, e.g. peracetic acid, with the cyclohexanone formed in the first stage to produce ε-caprolactone. The quantity of diluent used is so chosen that a 1–30% by weight solution, preferably a 5–15% solution of percarboxylic acid in the above mentioned diluents is obtained.

When isolating the peracid, e.g. by distillation with an inert diluent such as butyl acetate, amyl acetate, propyl propionate, butyl propionate or toluene, it is not necessary to convert all the hydrogen peroxide used into peracid nor is it necessary to isolate all the peracid formed since the unconverted portions of $H_2O_2$ and unisolated portions of peracid can be used again practically without loss. This applies particularly to the continuous method of carrying out the process of the invention, in which unconverted components or components which have not been isolated can be continuously returned.

For the reaction of cyclohexanone with percarboxylic acids by the process according to the invention it is particularly advantageous to provide an excess of cyclohexanone, preferably a 1.5–3 molar excess.

After the reaction of percarboxylic acids with the cyclohexanone formed in the first stage to produce ε-caprolactone, the solvents, carboxylic acids and excess cyclohexanone may be removed by distillation and used again.

The problem of materials can be solved as in all peroxide processes, for example the process may be carried out in enameled vessels or vessels coated with synthetic resin or in carefully passivated refined steel apparatus or apparatus made of passivated aluminium.

One important advantage of the process ensures the operational safety of a production plant used for the process according to the invention, namely the fact that the process can always be carried out within safe ranges of temperatures and concentrations.

The process of the invention is therefore suitable for the continuous production of ε-caprolactone from cyclohexanol and molecular oxygen. The figure shows diagrammatically a possible method of carrying out such a continuous process (FIG. 1).

Oxygen 10 and cyclohexanol 11 flow into the reactor 1. The reaction mixture coming from there is extracted with a counter-current of water in the extractor 2.

The upper phase of the extractor is separated by distillation in the column 3. Unreacted cyclohexanol 19 remaining in the sump of column 3 is returned to the reactor 1. Cyclohexanone is removed from the top and introduced into a reactor 7.

Hydrogen peroxide 12 obtained in the sump of extractor 2 is dehydrated with the phosphoric acid compounds according to the invention in column 4 and then reacted with carboxylic acids in reactor 5 to produce the corresponding peracid. The peracid is distilled off together with the diluent at 21 and the water of reaction is separated at 20 in the separator 6.

The peracid 22 now enters the reactor 7 together with cyclohexanone. The reaction mixture in the reactor 7 is distilled in column 8. The acid distilled at the top together with diluent 25 is returned to the reactor 5 and the cyclohexanone withdrawn in a side stream 24 is returned to the reactor 7.

The sump from column 8 is distilled in column 9, caprolactone being obtained as head product and the polymer components being discharged in the sump.

EXAMPLE 1

(a) Molecular oxygen is introduced with stirring at a temperature of 125° C. and a pressure of 7.5 excess atmospheres into an autoclave filled with 4 kg. of cyclohexanol to which 0.1 g. of cyclohexanone peroxide has been added until the active oxygen content is 3.2%, calculated as $H_2O_2$. The reaction is then stopped, and the reaction mixture is extracted with a counter-current of 2,800 g. of $H_2O$, a solution of 110 g. of $H_2O_2$ in 2,600 g. of $H_2O$ being obtained. This aqueous hydrogen peroxide solution is freed from dissolved cyclohexanol and cyclohexanone by extraction with cyclohexane. The organic phase contains 409.7 g. (4.18 mol) of cyclohexanone which is isolated by vacuum distillation.

(b) 70 g. of the dimethyl ester of methane phosphonic acid are added to an aqueous solution of $H_2O_2$ prepared according to Example 1(a), which solution contains 36.30 g. of $H_2O_2$ and 960 g. of $H_2O$, and 948 g. of $H_2O$ containing 0.22% of $H_2O_2$ are distilled at slight reflux over a glass column containing polyethylene filling bodies, 117.8 g. of distillation residue containing 29.7% of $H_2O$ being obtained.

(c) 23.0 g. of acetic acid and 0.8 g. of $H_2SO_4$ are added to 30 g. of a solution of 9.11 g. of $H_2O_2$ in dimethylmethane sulphonate in a flask equipped with a column with a water separator (the solution of $H_2O_2$ had been prepared according to Example 1(b). A sufficient quantity (129 g.) of a mixture of 90% of benzene and 10% of ethyl acetate to ensure the efficiency of the water separator is then added and distillation is carried out at 175 mm. Hg with total reflux of the lighter phase until the heavier phase ceases to be deposited in the condensate. The individual portions are then found to have the following analytical composition:

|  | Percent by weight | |
|---|---|---|
|  | $H_2O_2$ | Peracetic acid |
| Distillation sump (107.2 g.) | 0.45 | 14.40 |
| Upper phase of condensate (68.3 g.) | 0.08 | 3.24 |
| Lower phase of condensate (7.8 g.) | 0.57 | 30.08 |

The distillation sump obtained is combined with the upper phase of the condensate. The aqueous phase is added so that the solution obtained according to Example 1(a) can be used again, an organic phase (175.5 g.) being obtained which contains 0.31% by weight of $H_2O_2$ and 10.06% per weight of peracetic acid.

(d) 47.3 g. of a solution containing 7.60 g. (0.100 mol) of peracetic acid, which solution has been prepared according to Example 1(c), and 2 ml. of pyridine are introduced into a three-necked flask equipped with a stirrer, dropping funnel and cooler. 20.78 g. (0.212 mol) of cyclohexanone which has bene prepared according to Example 1(a) are then added dropwise, the temperature meanwhile being maintained between 40° C. and 50° C. When the reaction has terminated, the mixture contains 0.64% (0.40 g.) of peracetic acid and 12.68% (7.94 g.) of ε-caprolactone.

EXAMPLE 2

The procedure is the same as in Examples 1(a) and 1(b).

(c) A solution of 9.45 g. (0.28 mol) of $H_2O_2$ in 27.60 g. of dimethyl methane phosphonate (which solution has been prepared according to Example 1(a), 0.08 g. of $H_2SO_4$ and 1.67 g. (0.28 mol) of acetic acid are introduced into a flask equipped with a glass column which is filled with polyethylene filling bodies. 250 ml. of n-butyl acetate are then added dropwise in the course of one hour and continuously distilled over at 50 mm. Hg together with the peracetic acid which is formed. The individual portions are then found to have the following analytical composition:

|  | Total active oxygen calculated as $H_2O_2$ | | $H_2O_2$ percent | Peracetic acid, percent |
|---|---|---|---|---|
|  | Grams | Percent | | |
| Distillation sump | 43 | 7.38 | 4.11 | 7.32 |
| Distillate | 228.5 | 2.80 | 0.07 | 6.10 |

(d) A solution of 9.84 g. of $H_2O_2$ in 175 g. of $H_2O$ is added to the distillation sump which has been obtained according to Example 2(c) in an amount of 45 g. containing 2.83% (1.77 g.) of $H_2O_2$ and 6.47% (2.90 g.) of peracetic acid. The reaction mixture is dehydrated as in Example 1(b), but in contrast to Example 1(b), an additional organic phase is obtained in the distillate. This additional phase consists of butyl acetate which had been dissolved in the starting material prepared according to Example 2(c). The individual portions are found to have the following analytical composition:

|  | Weight, grams | $H_2O_2$ percent | Peracetic acid, percent |
|---|---|---|---|
| Distillation sump | 51.6 | 20.96 | 2.69 |
| Upper phase of distillate | 19.1 | 0.10 | 0.70 |
| Aqueous phase of distillate | 157.4 | 0.09 | 0.91 |

This distillation sump is used again as in Example 2(c) for the preparation of peracetic acid. This shows that it is neither necessary to convert all the hydrogen peroxide into peracids nor necessary to isolate the peracid completely since the unreacted portions and portions which have not been isolated can be used again without loss. This applies particularly to the continuous method of carrying out the process of the invention, in which the unreacted portions are returned.

(e) 15.68 g. (0.160 mol) of cyclohexanone which has been prepared as in Example 1(a) are introduced into the same apparatus as used in Example 1(d). A solution of 6.08 g. (0.080 mol) of peracetic acid in 80 g. of n-butyl acetate, which solution has been prepared according to Example 2(c), is then added dropwise and the temperature is meanwhile meaintained between 53° C. and 55° C. When the reaction has terminated, the mixture contains 0.63% (0.64 g.) of peracetic acid and 7.56% (7.69 g.) of ε-caprolactone which is isolated from the reaction solution by vacuum distillation.

Comparable results are obtained if triethyl phosphate, dimethyl β-cyanoethyl phosphonate and 1-methoxy-1-oxophospholane are used in Example 1(b) instead of dimethylmethane phosphonate. Practically the same yields are obtained if amyl acetate or benzene or mixture of

EXAMPLE 3

The procedure is the same as in Examples 2 to 2(d), a mixture of 90% of benzene and 10% of ethyl acetate being used in Examples 2(c) and 22(d), and ε-caprolactone is obtained as follows:

(e) A solution of 2.96 g. (0.039 mol) of peracetic acid in 62.04 g. of a mixture of 90% of benzene and 10% of ethyl acetate, which solution has been prepared according to Example 2(c), is introduced into a three-necked flask provided with a stirrer, dropping funnel and cooler. 70.06 g. (0.078 mol) of cyclohexanone which has been prepared according to Example 1(a) are added dropwise with stirring at temperatures of between 55° C. and 60° C. When the reaction has terminated, the reaction mixture contains 0.40% (0.29 g.) of peracetic acid and 5.53% (3.98 g.) of ε-caprolactone which is isolated by distillation.

What is claimed is:

1. Process for the preparation of ε-caprolactone which comprises oxidizing cyclohexanol with molecular oxygen in the liquid phase, hydrolyzing the resulting cyclohexanone peroxide to hydrogen peroxide and cyclohexanone and extracting the hydrogen peroxide with water in a first stage; mixing the aqueous solution of hydrogen peroxide from the first stage with one or more compounds of the following Formula I:

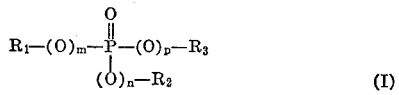

wherein $m$, $n$ and $p$ are 0 or 1 provided that $m$, $n$ and $p$ must not all simultaneously represent 0;

$R_1$, $R_2$ and $R_3$ which may be the same or different represent straight-chain or branched chain $C_1-C_6$ alkyl or $C_4-C_6$ cycloalkyl radicals and one of the radicals $R_1$, $R_2$ and $R_3$ may represent a phenyl radical and $R_1$ together with $R_2$ may represent a $C_2-C_4$ alkylene radical; in a second stage, removing water from the second stage reaction mixture and reacting same with a straight-chained aliphatic fatty acid having 1 to 6 carbon atoms optionally substituted by halogen, again removing water to form a percarboxylic acid solution which is thereafter reacted with the cyclohexanone formed in the first stage to produce ε-caprolactone.

2. Process of claim 1 wherein one or more of $R_1$, $R_2$ and $R_3$ represents a $C_1-C_6$ alkyl or $C_4-C_6$ cycloalkyl radical which is substituted with one or more radicals selected from the group of halogen, hydroxyl, $C_1-C_4$ alkoxy, carbo-$C_1-C_3$ alkoxy, CN and phenyl.

3. Process of claim 1 wherein one of the radicals $R_1$, $R_2$ and $R_3$ represents a phenyl radical substituted with one or more radicals selected from the group of halogen, hydroxyl, $C_1-C_4$ alkyl, $C_1-C_4$ alkoxy and CN.

4. Process of claim 1 wherein the compound of the Formula I is a phosphoric acid derivative of Formula II:

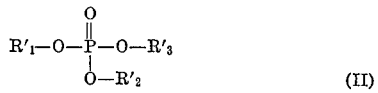

wherein $R_1'$, $R_2'$ and $R_3'$ which may be the same or different represent $C_1-C_4$ alkyl or cyclopentyl or cyclohexyl radicals optionally substituted with one or more radicals selected from the group of halogen, hydroxy, $C_1-C_4$ alkoxy, carbo-$C_1-C_3$ alkoxy, CN and phenyl and one of the radicals $R_1'$, $R_2'$ and $R_3'$ may represent a phenyl radical optionally substituted with one or more radicals selected from the group of halogen, hydroxyl, $C_1-C_4$ alkyl, $C_1-C_4$ alkoxy and —CN.

5. Process of claim 1 wherein the compound of the Formula I is a phosphonic acid derivative of Formula III.

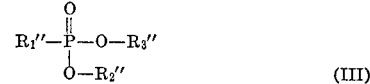

wherein $R_1''$ represents a $C_1-C_4$ alkyl or a cyclopentyl, cyclohexyl or phenyl radical optionally substituted with one or more radicals selected from the group of halogen, hydroxyl, $C_1-C_4$ alkoxy, carbo-$C_1-C_3$ alkoxy, CN and phenyl, $R_2''$ and $R_3''$ represent $C_1-C_6$ alkyl or $C_4-C_6$ cycloalkyl radicals optionally substituted with one or more radicals selected from the group of halogen, hydroxyl, $C_1-C_4$ alkoxy, carbo-$C_1-C_3$ alkoxy, CN and phenyl.

6. Process of claim 1 wherein the compound of the Formula I is a phosphinic acid derivative of Formula IV:

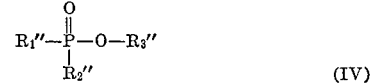

wherein $R_1''$, $R_2''$ and $R_3''$ are defined in claim 5.

7. Process of claim 1 wherein the compound of the Formula I is a phosphinic acid derivative of Formula V:

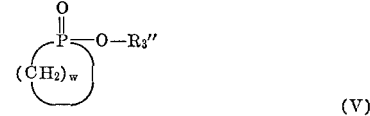

wherein $R_3''$ represents $C_1-C_4$ alkyl or $C_4-C_6$ cycloalkyl radicals optionally substituted with one or more radicals selected from the group of halogen, hydroxyl, $C_1-C_4$ alkoxy, carbo-$C_1-C_3$ alkoxy, CN and phenyl, and $w$ represents an integer of 4 to 7.

8. Process of claim 1 wherein the compound of the Formula I is a compound of the Formula VI:

wherein $R_{12}$, $R_{13}$ and $R_{14}$ which may be the same or different represent straight-chain or branched chain $C_1-C_4$ alkyl radicals optionally substituted with one or more radicals selected from the group of halogen, hydroxyl, $C_1-C_4$ alkoxy, carbo-$C_1-C_3$ alkoxy, CN and phenyl.

9. Process of claim 1 wherein the compound of the Formula I is a compound of the Formula VII or VIII:

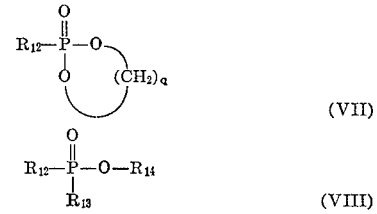

wherein $R_{12}$, $R_{13}$ and $R_{14}$ are as defined in claim 8 and $q$ represents the integer 2, 3 or 4.

10. Process of claim 1 wherein the compound of the Formula I is a compound of Formula IX:

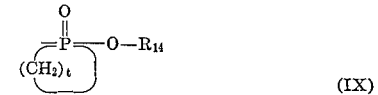

wherein $R_{14}$ represents straight-chain or branched chain $C_1-C_4$ alkyl radicals optionally substituted with a radical selected from the group of halogen, hydroxyl, $C_1-C_4$ alkoxy, carbo-$C_1$-$C_3$ alkoxy, CN and phenyl and $t$ represents the integer 4 or 5.

11. Process of claim 1 wherein the compound of the general Formula I is a compound of Formula X:

(X)

wherein $R_{12}$ represents a straight-chain or branched chain $C_1$-$C_4$ alkyl radical optionally substituted with a hydroxyl or methoxy group or both and $R_{13}$ represents a straight-chain or branched chain $C_1$-$C_4$ alkyl radical optionally substituted with one or more radicals selected from the group of halogen, hydroxyl, $C_1$-$C_4$ alkoxy, carbo-$C_1$-$C_3$ alkoxy, CN and phenyl.

12. Process of claim 1 wherein the compound of the Formula I is a compound of Formula XI:

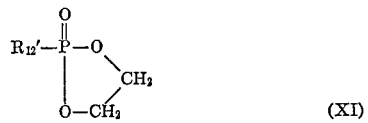

(XI)

wherein $R_{12}'$ represents a straight-chain or branched chain $C_1$-$C_4$ alkyl radical optionally substituted with a hydroxyl or methoxy group.

13. Process of claim 1 wherein the reaction mixture is reacted with said aliphatic fatty acid in the presence of an esterification catalyst.

14. Process of claim 1 wherein after reaction with said aliphatic fatty acid the reaction mixture is dehydrated with the aid of an inert diluent.

15. Process of claim 1 wherein the water originally used as solvent for hydrogen peroxide is removed by vacuum distillation at a pressure below 400 mm. Hg.

16. Process of claim 15 where a pressure below 100 mm. Hg is employed.

17. Process of claim 1 wherein a substantial quantity of the water is removed by single-stage evaporation and the remainder of the water by distillation over a column with a reflux ratio of between 0.5 and 5.

18. Process of claim 17 wherein half the water is removed by single-stage evaporation.

19. Process of claim 1 wherein the water is removed prior to reaction with an aliphatic fatty acid with the aid of an inert diluent.

20. Process of claim 1 wherein the carboxylic acid used is selected from the group of acetic acid, chloroacetic acid and propionic acid.

21. Process of claim 1 wherein the molar ratio of hydrogen peroxide to carboxylic acid is selected to be in the range of from 1:1.1 to 1:1.5.

22. Process of claim 1 wherein the water formed in the reaction with carboxylic acid is removed by azeotropic distillation.

23. A process of claim 22 wherein a pressure of 20 mm. Hg to 200 mm. Hg is employed.

24. Process of claim 14 wherein the diluent used is a mixture of acetic acid esters and aromatic hydrocarbons.

25. Process of claim 14 wherein the diluent is methylene chloride.

26. Process of claim 14 wherein the percarboxylic acids are distilled over together with the diluent, preferably under vacuum.

27. Process of claim 13 wherein the case where sulphuric acid is used as catalyst, the 2–10 times molar quantity of organic bases is added before the reaction with cyclohexanone.

28. Process of claim 27 wherein the organic base is pyridine.

29. Process of claim 1 wherein a 1.5 to 3 times molar excess of cyclohexanone is used.

References Cited

UNITED STATES PATENTS

| | | | |
|---|---|---|---|
| 3,227,730 | 1/1966 | Goldsmith et al. | 260—343 |
| 3,517,033 | 6/1970 | Weiberg | 260—343 |
| 3,530,218 | 9/1970 | Floyd | 260—343 |

JOHN M. FORD, Primary Examiner

PO-1050
(5/69)

UNITED STATES PATENT OFFICE
CERTIFICATE OF CORRECTION

Patent No. 3,766,212        Dated October 16, 1973

Inventor(s) H. Waldmann et al.

It is certified that error appears in the above-identified patent and that said Letters Patent are hereby corrected as shown below:

| | |
|---|---|
| Column 2, line 58 | "$CH_3$-CHOH-$CCH_3$" should read --$CH_3$-CHOH-$CH_3$--; |
| column 3, line 28 | "$C_1C_3$" should read --$C_1$-$C_3$--; |
| Column 3, lines 28 and 29 | after "$R_1$" insert --$R_2$ and $R_3$ may represent a phenyl radical--; delete "$C_1$-$C_3$ alkyl or $C_4$-$C_6$ cycloalkyl radicals" |
| Column 4, line 58 | after "carbo-" $C_1C_3$ should read --$C_1$-$C_3$-- |
| Column 7, line 17 | "methylpentyl" should read -- methyl-pentyl -- . |
| Column 7, line 37 | "chlorocyclohexyl" should read --chloro-cyclohexyl--. |
| Column 9, line 1 | "true" should read --tube--. |
| Column 9, line 11 | "220 mm." should read --20 mm.--. |

PO-1050
(5/69)

UNITED STATES PATENT OFFICE
CERTIFICATE OF CORRECTION

Patent No. 3,766,212  Dated October 16, 1973

Inventor(s) H. Waldman et al.  PAGE 2

It is certified that error appears in the above-identified patent and that said Letters Patent are hereby corrected as shown below:

-Page 2-

| | |
|---|---|
| Column 12, line 15 | "0.08 g." should read --0.8 g.--. |
| Column 12, line 16 | "1.67 g." should read --16.7 g.--. |
| Column 12, line 75 | "mixture" should read --mixtures--. |
| Column 13, line 7 | "22(d)" should read --2(d)--. |
| Column 13, line 55 | "scbstituted" should read --substituted" |

Signed and sealed this 20th day of August 1974.

(SEAL)
Attest:

McCOY M. GIBSON, JR.  C. MARSHALL DANN
Attesting Officer  Commissioner of Patents